No. 888,514.
PATENTED MAY 26, 1908.
B. G. LAMME.
ARMATURE WINDING FOR ELECTRICAL MACHINES.
APPLICATION FILED AUG. 17, 1904.
Fig.
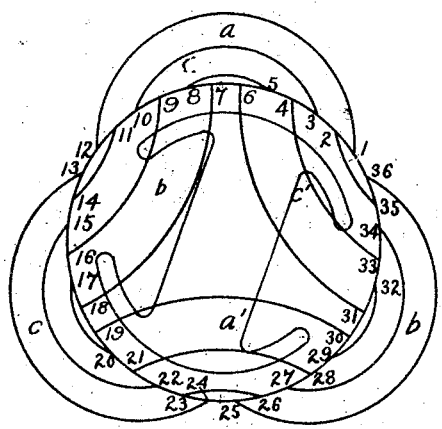
Fig. 2.
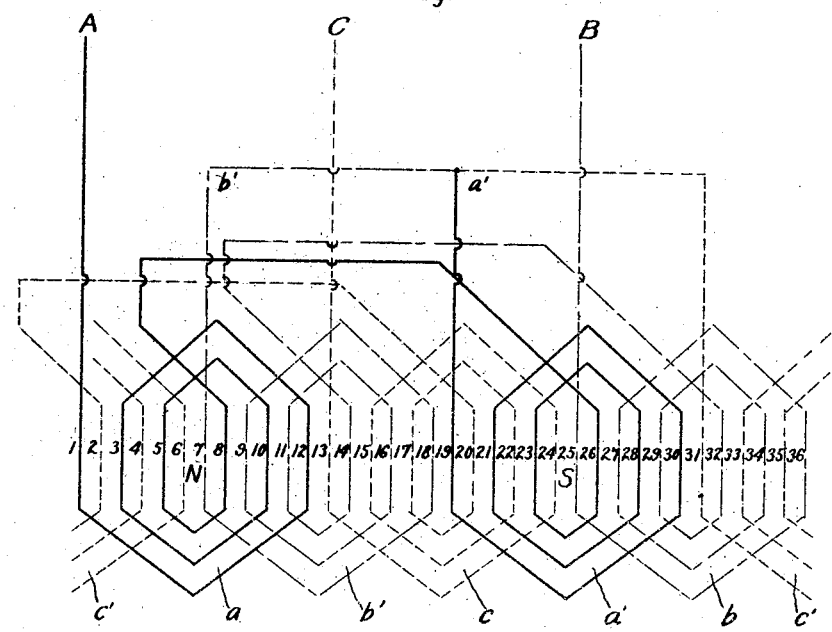
WITNESSES:
Fred H. Miller
Otto S. Schairer
INVENTOR
Benjamin G. Lamme
BY
Wesley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ARMATURE-WINDING FOR ELECTRICAL MACHINES.

No. 888,514.      Specification of Letters Patent.      Patented May 26, 1908.

Application filed August 17, 1904. Serial No. 221,093.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Armature-Windings for Electrical Machines, of which the following is a specification.

My invention relates to armature windings for electrical machines, and it has for its object to provide a winding for machines having small numbers of poles and large diameters which will afford a better mechanical construction than any heretofore devised for the purpose and by the use of which a characteristic curve of practically a sine wave form may still be obtained.

It frequently occurs in the design and construction of electrical machines that two poles corresponding to each current phase are employed, which heretofore has required a winding having spans of 180°, resulting in a rather weak mechanical construction. In the winding comprising my present invention, the length of the end connectors is very much reduced as compared with the ordinary construction and, consequently, a better and more satisfactory mechanical construction is afforded, while the sine wave form of the characteristic curve remains substantially unaffected.

My invention is illustrated in the accompanying drawing, in which

Figure 1 is a diagrammatic, end view of an armature constructed in accordance therewith, and Fig. 2 is a diagrammatic view of a winding in development.

Instead of providing the armature core with windings for each phase, which induce, at any instant, north poles in certain portions of the magnetic circuit and south poles in the corresponding opposite portions, I have provided the armature with a winding in two parts for each phase, one portion of each of the windings inducing, at any instant, north poles in certain portions of the magnetic circuit and the other portions inducing south poles, at the same instant, in corresponding opposite portions of the magnetic circuit. With this arrangement, if a machine is designed for operation on three-phase circuits, the polar span for each portion of the winding is one-third of the circumference of the armature, or the maximum span for any one coil is 120°, and in a two-phase machine, the polar span for each portion of the winding is one quarter of the circumference of the armature, or the maximum span for any one coil is 90°.

In the drawing, the winding for phase A of a two-pole machine is divided into two portions *a* and *a'*, the portion *a* being wound so that it spans one-third of the circumference, or from slots 1 to 12, and occupies alternate slots between these numbers, the portion *a'* spanning one-third of the circumference from slot 19 to slot 30 and occupying alternate slots between those numbers. The two portions *a* and *a'* are so connected that at the same instant the former produces a north pole at N and the latter a south pole at S. The other two phases of the winding are similarly wound and occupy the remaining vacant slots, the windings being connected together at their inner ends in order to form a complete star winding for the armature. With this arrangement of windings, the voltage generated with a given number of wires in each slot is practically one-half that of the ordinary type of winding; that is, in order that the same voltage may be generated by a machine constructed in accordance with this invention as would be generated by a machine of the ordinary construction, the number of conductors in each slot must be doubled. However, this is not a serious disadvantage, for the reason that the amount of available space in the slots for the winding is ample and the increased number of turns is therefore permissible.

While I have shown and described my invention as applied only to a three-phase machine, it is evident that a similar construction of winding may be provided for two-phase machines. It is also evident that the use of this type of winding is not limited to two-pole machines, but that it may be employed in machines having a larger number of poles, though the advantages to be derived from its use are generally not as great in a machine having a relatively small polar span.

I claim as my invention:

1. A winding for polyphase electrical machines, comprising a plurality of groups of coils for each phase of current that induce corresponding opposite magnetic poles approximately 180 electrical degrees apart, the sides of the coils of each group alternating in position with the sides of those of other groups that correspond to the other phase or phases of current.

2. In a polyphase electrical machine, a slotted armature and a winding for each phase of current that comprises as many groups of a plurality of coils each as there are field poles, the coils of each group being located in slots that alternate in position with those which contain the coils of other groups that correspond to the other phase or phases of current.

3. In a polyphase electrical machine, a slotted armature and a winding for each phase of current that comprises as many groups of a plurality of coils each as there are field poles, the windings being distributed in the armature slots so that the sides of coils corresponding to different phases of current alternate in position.

4. A winding for polyphase electrical machines comprising a plurality of coils that are divided into a plurality of groups for each phase of the current, the sides of the coils of each group alternating in position with the sides of the coils of other groups.

5. A winding for polyphase electrical machines comprising a plurality of groups of coils equal in number to the product of the number of field poles by the number of phases, the sides of the coils of each group alternating in position with the sides of the coils of other groups.

6. A winding for polyphase electrical machines comprising a plurality of groups of coils equal in number to the product of the number of field poles by the number of phases, the sides of the coils of each group alternating in position with the sides of the coils of other groups, and each phase position of the winding being arranged to produce opposite magnetic poles 180 electrical degrees apart.

7. A winding for polyphase electrical machines, each phase circuit of which comprises as many groups of a plurality of coils each as there are field poles, the sides of the coils of each group alternating in position with the sides of the coils of other groups.

In testimony whereof, I have hereunto subscribed my name this 11th day of August, 1904.

BENJ. G. LAMME

Witnesses:
E. M. STEWART,
BIRNEY HINES.